United States Patent Office 3,004,053
Patented Oct. 10, 1961

3,004,053
PREPARATION OF ORGANOSILANES EMPLOYING ALKYL ALUMINUM HALIDES
Isao Shiihara and Jun Iyoda, Osaka City, and Hiroshi Takahashi, Sakai City, Japan, assignors to the Director of the Agency of Industrial Science and Technology, The Ministry of International Trade and Industry, Japanese Government, Tokyo, Japan
No Drawing. Filed Mar. 24, 1959, Ser. No. 801,451
Claims priority, application Japan Mar. 28, 1958
5 Claims. (Cl. 260—448.2)

This invention relates to process for preparing organometallic compounds, and more particularly to the production of organo-metallic compounds of the type, wherein an organic residual radical is bonded directly to the silicon atom.

One of the objects of this invention is therefore to provide a process for preparing organo-silicon compounds, at least one of the oxygen linkages of which compound is so substituted with an organic residual radical that said organic residual radical is bonded directly to the silicon atom.

In accordance with this invention, a silicon compound, either organic or inorganic, having at least one oxygen atom bonded directly to the silicon atom, is mixed with one or more alkylaluminum halides to obtain the desired organo-silicon compound. Pressure, heat and stirring are employed, where necessary.

Accordingly, unlike the conventional method to react a halide of silicon, or an ester of silicic acid, with Grignard's reagent, a feature of this invention is in simple procedure and ease of production.

Unlike the so-called direct method employing processed compounds, furthermore, another feature of this invention is that the silicate employed therein is either naturally obtainable or easily manufactured.

The organic and inorganic compounds of silicon employed in this invention are represented by the formulas

    (A)

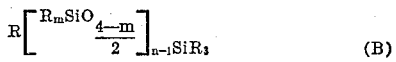    (B)

where R represents a member of the group consisting of alkyl, aryl, aralkyl, cycloalkyl, alkylcycloalkyl and alkenyl radicals, halogen- and alkoxy-substituted radicals of said radicals, hydroxy and alkoxy radicals, silanolate- and silicate- forming —O— metal radicals and hydrogen and halogen atoms; $m$ is any number smaller than 4 and larger than and equal to 0 ($4>m\geq0$); $n$ is any integer larger than and equal to 1 ($n\geq1$). Said R is not necessarily of the same type in the compound. But at least one of said R's must be a member of the group consisting of alkoxy, hydroxy and —O— metal radicals when $n$ is equal to 1 in the compound having the structural Formula B. Furthermore, not only monomers but also chain, cyclic and network polymers are employed. As a silicon compound, for instance, are employed silicon dioxide, sodium silicate anhydride, chloropolysiloxanes and other inorganic siloxanes; linear organo-polysiloxanes represented by the formula $R[R_2SiO]_nSiR_3$; cyclic organo-polysiloxanes having the formula $[R_2SiO]_n$; network organo-polysiloxanes having the formula $[RSiO_{3/2}]_n$; and alkoxysilanes and silanolates and their polymers. Compounds having active hydrogen atoms like silanol are preferably employed in the form of a dehydrated compound, since the active hydrogen atoms undergo undesired reaction with the alkylaluminum halide prior to the reaction with the organic radical.

The alkylaluminum halides employed in this invention are represented by the formula $R_pAlZ_{3-p}$, where R is an alkyl radical and Z is a halogen atom and $p$ is any number larger than 0 and smaller than 3. In practice, to any of these alkylaluminum halides may be added anhydrous aluminum halide in any amount. The reactivity of said alkylaluminum halide decreases slightly with an increase in the number of carbon atoms present in the alkyl radical or in the order of chloride, bromide and iodide. In general, alkylaluminum chlorides are employed because of manufacturing advantage, ease of procedure, strong reactivity and relatively large proportion by weight of the organic residual radicals, characterising said chlorides.

The reaction is performed in an inert atmosphere such as nitrogen gas. An inert solvent may be added to the mixture, which addition, however, is avoided in many instances, since the reagent alkylaluminum halide acts as an effective solvent of silicon compounds on heating. In mixing, it does not matter whether the alkylaluminum halide is added to the silicon compound or vice versa. But it is preferable to add carefully the alkylaluminum halide to the silicon compound because of the strong reactivity of said reagent. Some instances show a marked heat of dissolution or of reaction, or gas generation. The mixture is usually heated to the reaction temperature which is usually no more than 300° C. and kept at said temperature for a definite period of time. The mixture is cooled when much reaction heat is generated. A temperature higher than the reaction temperature tends to decompose the alkylaluminum halide. Stirring is applied to avoid the local heat and to smoothen the reaction, where necessary. When the reaction temperature gets higher than the boiling point of the reactants, the reaction is preferred to be accomplished in an autoclave. In general, however, heating under reflux suffices, since the temperature needed for performing the reaction is usually lower than the boiling point of the reactants. The reaction product is distilled and taken out of the system in the course of the reaction when the boiling point of said product is lower than the reaction temperature. Much heat and froth are generated in some instances when the reaction happens to take place suddenly, and the reaction system turns in its entirety into a gel.

To exemplify the reaction of this invention, ethyl silicate is reacted with methylaluminum sesquichloride to yield tetramethylsilane, ethyl chloride and aluminum oxide as final products in accordance with the following equation:

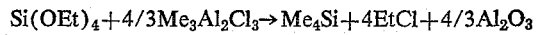

Hexamethyldisiloxane is reacted with methylaluminum sesquichloride to form tetramethylsilane and aluminosilicate in accordance with the following equation:

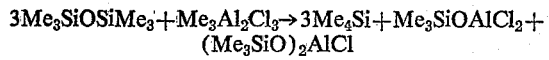

These intermediates $Me_3SiOAlCl_2$ and $(Me_3SiO)_2AlCl$ are distillable at normal pressure, although their boiling points are relatively high. When heated for distillation, said intermediate undergo partial decomposition to produce organo-chlorosilane in accordance with the following equations:

and

A cyclic organo-polysiloxane is reacted with said alkylaluminum halide to produce alumino-silicates as intermediate products in accordance with the following equation:

The polymer is cleavaged and methylated. These intermediate products are further decomposed to form alkylchlorosilanes in accordance with the above stated formulas.

This invention is not confined to the production of polyorganosubstituted organo-silanes. For instance, dimethyltetrachlorodisiloxane MeCl$_2$SiOSiCl$_2$Me is reacted with Me$_3$Al$_2$Cl$_3$ to produce dimethyldichlorosilane Me$_2$SiCl$_2$. But it is more or less difficult to obtain MeSi(OEt)$_3$ or Me$_3$Si(OEt)$_2$ directly from the reaction of ethyl silicate with methylaluminum sesquichloride, for the reason that the intermediate products methylethoxysilane, although formed in the process, are decomposed by the coexisting aluminum compound or chlorine compound.

Major examples of the products resulting from the reaction of silicon compounds with the alkylaluminum halide are organo-silanes, organo-halosilanes, organo-alkoxysilanes, polyorgano-siloxanes and polyorgano-polyhalosiloxanes. These products are all distillable. The volatile organo-halides and ethers are largely recollected to advantage as by-products. These main products and by-products are all employed for silicone industry. Besides the aluminum oxide, the solid residue, which is produced in diverse amounts in the course of the reaction, is hydrolyzed to produce silanols or water organic solvent soluble organo-aluminosilicate compounds to be used as water-repellants with or without neutralization with alkali. Organo-polysiloxane oil such as hexaalkyldisiloxane is also obtainable therefrom. The wasted gel which is produced in the conventional silicone industry is also employed as a starting material for producing the organo-silicon compounds of this invention.

For a better understanding of the invention the following examples are given, which are all performed in a dry nitrogen atmosphere.

*Example 1*

16.5 grams of hexamethyldisiloxane Me$_3$SiOSiMe$_3$ was placed in a 200 cc. glass flask. 19.0 grams of methylaluminum sesquichloride was added dropwise. The mixture dissolved uniformly, generating a slight heat. The reactants were warmed in an oil bath and distilled, yielding 6.5 grams of distillate boiling at 30° to 130° C. (sp. gr. 0.65), 16.0 grams of distillate boiling at 167° to 205° C. (sp. gr. 0.96), 5.5 grams of distillate boiling at 226° to 236° C., and 2.5 grams of a dark brown residue. When redistilled, the entire volume of the first fraction was identified with tetramethylsilane Me$_4$Si having a boiling range of 27.5° to 28.0° C. The second fraction showed 18.8% Al and 34.8% Cl, apparently containing as main components (Me$_3$SiO)$_2$AlCl and MeAlCl$_2$. The third fraction was a crystalline substance with a melting range of 82° to 88° C., containing 35.9% Cl. This substance was identified with trimethylsiloxyaluminum dichloride Me$_3$SiOAlCl$_2$ prepared theoretically from Me$_3$SiOSiMe$_3$ and AlCl$_3$.

*Example 2*

22 grams of hexamethyldisiloxane was placed in a flask equipped with a reflux condenser. 25 grams of diethylaluminum bromide Et$_2$AlBr was added. The mixture was refluxed for 1 hour in an oil bath warmed to 120° to 140° C. 17.5 grams of liquid boiling at 77° to 92° (sp. gr. 0.78) was obtained. Redistillation of this liquid gave 1.6 grams of distillate having the initial boiling point of 62° C. and main boiling range of 70° to 78° C., 5.5 grams of distillate boiling at 78° to 95° C., and 5.5 grams of unreacted hexamethyldisiloxane having a boiling range of 98° to 100° C. The first and second fractions were a mixture of trimethylethylsilane Me$_3$SiEt with a boiling point of 62° C. and trimethylbromosilane Me$_3$SiBr with a boiling point of 80° C., containing 52.21% Br. Analysis in terms of Br showed 10.0 grams of Me$_3$SiEt and 1.5 grams of Me$_3$SiBr.

*Example 3*

To 35.5 grams of cyclic dimethylsiloxane trimer [Me$_2$SiO]$_3$ was added dropwise 32 grams of methylaluminum sesquichloride. The mixture dissolved, generating a slight heat. Distillation with warming in an oil bath yielded 7.0 grams of distillate boiling at 138° to 144° C. (sp. gr. 0.795), 37 grams of distillate boiling at 180° to 240° C. (sp. gr. 0.98), and 21.5 grams of brittle, light brown, resinous residue. Redistillation of 5.0 grams of the first fraction yielded 2.5 grams of liquor boiling at 98° to 145° C. (sp. gr. 0.60), and 1.5 grams in all boiling at 145° to 174° C. and 190° to 220° C. These substances are assumed to contain Me$_3$SiOSiMe$_3$ and its homologous polymers and chlorine substituents.

The second fraction, on the other hand, isolated 16.0 grams of a crystalline substance when allowed to cool. The liquid phase showed 4.82% Al and 16.0% Cl, apparently containing (Me$_3$SiO)$_2$AlCl as a main component and Me$_3$SiCl as a decomposition product. When redistilled, 16.5 grams of this liquid yielded 3.5 grams of distillate boiling at 64° to 90° C., 7.5 grams of distillate boiling at 115° to 162° C., and 3.0 grams of residue. Analysis showed that the main component of the first fraction was chlorosilane and that of the second aluminosilicate.

The crystal phase isolated from the second fraction revealed 15.5% Al and 27.3% Cl, corresponding approximately to the theoretical composition of trimethylsiloxyaluminum dichloride Me$_3$SiOAlCl$_2$. Redistillation of said crystalline substance resulted in 3.0 grams of distillate boiling at 60° to 230° C. and 6.0 grams of distillate boiling at 233° to 246° C. The former fraction contained chlorosilane as a main constituent, and the latter was identified with trimethylsiloxyaluminum dichloride.

The resinous residue remaining in the flask was water-soluble. 11.0 grams of said residue yielded 2.0 grams of fraction boiling at 60° to 160° C. when heated with a direct flame. Redistillation resulted in Me$_3$SiCl having a boiling range of 55.5° to 60° C., showing 33.2% Cl. The Me$_3$Si— radical produced by the methylation of the —O—SiMe$_2$O— was therefore contained in the residue.

*Example 4*

To 20 grams of cyclic diethylsiloxane tetramer [Et$_2$SiO]$_4$ was added dropwise 12 grams of methylaluminum sesquichloride. The mixture was warmed in an oil bath heated to 280° C. No distillate was obtained. Distillation with direct heating resulted in 21 grams of distillate boiling at 124° to 250° C. Redistillation yielded 4.5 grams of dimethyldiethylsilane Me$_2$SiEt$_2$ having a boiling range of 98° to 105° C., 7.0 grams of methyldiethylchlorosilane MeEt$_2$SiCl having a boiling range of 120° to 125° C., and 7.0 grams of an aluminum-contained light yellow liquid having a boiling range of 140° to 260° C.

*Example 5*

To 10 grams of cyclic diphenylsiloxane trimer [Ph$_2$SiO]$_3$ was added dropwise 7 grams of methylaluminum sesquichloride. The mixture was heated at 150° C. for 1.5 hours. The resulting homogeneous solution was dissolved in 20 cc. of ether, and water-saturated ether was added thereto. The ether solution was then dropped in an ice-cold water and hydrolyzed completely with diluted sulfuric acid. Removing the ether layer, the water phase was extracted with ether. The extracts were then combined and dried with anhydrous sodium sulfate, and the ether was distilled off. 10 grams of oily substance was obtained. Reduced distillation of this substance resulted in 2.0 grams of diethyldiphenylsilane having a boiling range of 156° to 160° C. at 12 mm. and 5.5 grams of residue containing dimethyltetraphenyldisiloxane MePh$_2$SiOSiPh$_2$Me as a main component.

Example 6

18 grams of tetramethyldiphenyldisiloxane

Me₂PhSiOSiPhMe₂ having a boiling range of 141° to 144° C. at 45 mm. and 17 grams of methylaluminum sesquichloride were reacted at 170° to 190° C. for 45 minutes. Reduced distillation resulted in 5.0 grams of an oily substance having a boiling range of 83° to 86° C. at 34 mm. This substance contained no halogen and was identified with trimethylphenylsilane Me₃SiPh.

Example 7

To 20 grams of General Electric SF 96 oil containing dimethylsilicone as a main component was added 23 grams of methylaluminum sesquichloride. These two substances were immiscible. But a homogeneous mixture was formed when heated in an oil bath, and the mixture crystallized when cooled after heating for 30 minutes at 200° C. Distillation of 18.5 grams of this crystalline substance yielded 0.5 grams of distillate boiling at 60° to 140° C., a substance resulting from the decomposition products and the oil, and 14.0 grams of distillate boiling at 240° to 246° C. The latter fraction was identified with trimethylsiloxyaluminum dichloride Me₃SiOAlCl₂.

Example 8

To 25 grams of newly distilled ethyl silicate was added dropwise 31.5 grams of methylaluminum sesquichloride. The mixture generated a strong heat. This was allowed to stand overnight and distilled. Simultaneously with the distillation, the liquid started to turn into a resinous substance. During the distillation were obtained 7.0 grams of ethyl chloride in the Dry Ice-acetone trap and 0.5 gram of a water-cooled condensate, sp. gr. 0.65. Analysis of the latter product showed tetramethylsilane. The resinous residue was pulverized and distilled, yielding 10.0 grams of distillate boiling at 55° to 140° C. (sp. gr. 0.91), 3.0 grams of ethyl chloride in the trap, and 26.5 grams of light brown thermoplastic resin. Redistillation of the fractions resulted in 1.0 gram of tetramethylsilane and 3.5 grams of a mixture containing Me₃SiCl and Me₃SiOEt.

The aforesaid resinous residue, on the other hand, was partially soluble in water, forming a gel. Unlike the reaction with methylaluminum compounds, no gas was generated. The residue was also soluble in an organic solvent such as dioxane, toluene and xylene, and the solution proved water-repellent when applied to cloth. It is therefore apparent that the silicon was methylated.

Example 9

To 44.5 grams of ethyl silicate was added dropwise 16 grams of methylaluminum sesquichloride. The mixture was allowed to stand overnight and fractionally distilled, yielding 7.0 grams of distillate having an ethereal odor and boiling at 45° to 113° C., 24.0 grams of distillate boiling at 113° to 166° C., 3.5 grams of ethyl chloride in the Dry Ice-acetone trap, and 4.3 grams of a resinous residue in the flask. Dedistillation showed that the first fraction contained ether and ethyl chloride, and the second fraction various forms of methylethoxysilanes and a slight amount of Si—O—Al bonded compounds. The remaining residue revealed properties similar to those exemplified in Example 8.

Example 10

To 6 grams of hydropolysiloxane [HSiO₃/₂]ₙ, a hydrolyzed product of silicochloroform, was added 16 grams methylaluminum sesquichloride. The mixture was heated in an oil bath warmed to 250° C. yielding 3.0 grams of condensate (sp. gr. 0.60) in the Dry Ice-acetone trap, and 2 grams of distillate boiling at 26° to 48° C. This distillate was redistilled and the product was identified with tetramethylsilane, since the product had a boiling range of 27° to 34° C., containing no halogen, and did not react with alcoholic sodium hydroxide. The former condensate, on the other hand, judging from the boiling range and the silicon contained therein, is assumed to be a mixture of Me₃SiH and MeSiH₃, supposedly deriving as an intermediate from HSiMe₃ in accordance with the following formula:

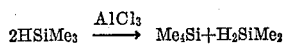

$$2\text{HSiMe}_3 \xrightarrow{\text{AlCl}_3} \text{Me}_4\text{Si} + \text{H}_2\text{SiMe}_2$$

Example 11

To 10 grams of 60-mesh powder methylpolysiloxane [MeSiO₃/₂]ₙ, a hydrolyzed product of methyltrimethoxysilane MeSi(OMe)₃, was added dropwise 31 grams of methylaluminum sesquichloride. The mixture was warmed up slowly in an oil bath. A sudden reaction took place at 145° C., generating a heat, and part of the employed methylaluminum sesquichloride was distilled out. The reaction was allowed to continue at said temperature for 1 hour, and the mixture turned into a homogeneous liquid. No distillate was obtained even when the temperature of the oil bath was raised to 200° C. Redistillation of the aforesaid distillate containing methylaluminum sesquichloride yielded 0.8 gram of a substance boiling at 26° to 50° C. which was later identified with tetramethylsilane. The homogeneous reaction liquid, on the other hand, was allowed to cool. The resulting crystalline substance failed to distil because of its viscosity and generated gas. But the substance was colloidally soluble in water, having an odor like silanol. The ether extract produced a mixture of Me₃SiOH and Me₃SiOSiMe₃, having a boiling range of 98° to 102° C.

Example 12

20 grams of methylpolysiloxane employed in Example 11 was placed in an 1-liter stainless steel autoclave equipped with an electromagnetic stirrer. 65 grams of methylaluminum sesquichloride was added. The mixture was compressed to 20 atmospheric pressure with nitrogen gas. After 2 hours reaction at 160° to 180° C., the reaction mixture turned into a slurry, having an odor like chlorosilane. Distillation of said substance yielded 24 grams of distillate boiling at 26° to 120° C. and 48 grams of a brown, brittle, resinous residue. Redistillation of this distillate produced 0.5 gram of tetramethylsilane having a boiling range of 27° to 28° C. and 16.5 grams of trimethylchlorosilane having a boiling range of 57° to 60° C.

Example 13

An equimolar mixture of methyltrimethoxysilane MeSi(OMe)₃ and methylsilicate Si(OMe)₄ was cohydrolyzed with hydrochloric acid. To 10 grams of the resulting 60-mesh powder polysiloxane [SiO₂·MeSiO₃/₂]ₙ was added 39.5 grams of methylaluminum sesquichloride. The mixture started to react at 160° C., boiling gently. After 30 minutes reaction at 160° to 170° C., the bath was warmed to 210° C. and the reaction mixture was distilled, yielding 10 grams of distillate boiling at 51° to 115° C. Redistillation of said distillate produced 6.5 grams of tetramethylsilane having a boiling range of 26° to 32° C. and 36 grams of a light brown powder as a residue. This powder formed a colloidal solution with water, having an odor like silanol as shown in Example 12.

Example 14

Various forms of inorganic chlorosilanes were hydrolyzed with aqueous alcohol. The resulting gel was ignited to obtain ash. 10 grams of the silicon dioxide thus obtained and 45 grams of methylaluminum sesquichloride were heated in an oil bath. The reaction took place at 200° C., generating a white smoke. 24 grams of distillate boiling at 144° to 213° C. was obtained. This distillate was diluted with hexane C₆H₁₄, and the organoaluminum in excess was decomposed with ethanol. After removing the solvent by distillation, the residue was ignited to obtain ash. The resulting product was boiled several times with hydrochloric acid to extract the aluminum component. 0.524 gram of $SiO_2$ was obtained in the form of residue. This fact testifies that the —Si—O—Si— bond of the silicic acid polymer was cleavaged and methylated. Out of the reaction residue was obtained 9.36 grams of $SiO_2$ in the same manner as described hereinbefore.

*Example 15*

36 grams of cyclic dimethylsiloxane tetramer $$[Me_2SiO]_4$$

and 25 grams of methylaluminum sesquichloride were reacted in a manner as described in Example 3. Fractional distillation yielded 9.0 grams of an oily substance boiling at 139° to 195° C. and containing 10.05% Cl and 2.8% Al (sp. gr. 0.82), 25.5 grams of distillate boiling at 197° to 217° C. and containing 18.0% Cl and 6.5% Al (sp. gr. 0.91), and 22.5 grams of brittle resinous residue. The oily substance thus obtained was estimated by its boiling range and other analysis data as a mixture of $ClMe_2SiOSiMe_3$, $ClMe_2SiOSiMe_2Cl$ and a small amount of aluminum compounds. The second fraction separated on standing a crystalline substance. 23.5 grams of said substance was hydrolyzed and extracted with ether, and the ether was distilled off. Out of the ether extract was obtained 17.0 grams of an oily substance mainly consisting of trimethylsilanol, hexamethyldisiloxane and a small amount of linear methylpolysiloxane.

The aforesaid resinous residue, on the other hand, was decomposed with water, and the oily substance separated was collected. Distillation yielded 7.5 grams of an oily substance mainly consisting of trimethylsilanol. The remaining water layer was neutralized with a 1 N sodium hydroxide solution and the solution was acidified with acetic acid. White precipitate was thus produced and about 2 grams thereof was collected. This substance was recrystallized several times with water, and the melting point of the final product reached 63° to 67° C.

The OH group content was 21.3%. The product was identified with tetramethyldisiloxanediol $$HOMe_2SiOSiMe_2OH$$

The instant example testifies to the possibility that the preparation of siloxanediols, which has hitherto been deemed very difficult, can be performed quite easily. The aqueous solution of said diols can be employed as an excellent plastic water-repellent.

Various changes and modifications may be made in the processes described hereinbefore as will be apparent to those skilled in the art without departing from the spirit and scope of the invention. It is accordingly our intention that the invention be not limited by any of the details of description unless otherwise specified and rather be construed broadly within the intent of the invention as set forth in the accompanying claims.

What we claim is:

1. A process for producing alkyl hydrosilanes which comprises reacting hydropolysiloxane with an alkylaluminum halide of the general formula $$R_pAlX_{3-p}$$

wherein R is a alkyl group, X is a halogen atom and $p$ is any number larger than 0 and smaller than 3.

2. The process of claim 1 in which R is a methyl group.

3. The process of claim 1 in which R is an ethyl group.

4. The process of claim 1 wherein the alkylaluminum halide is methyl aluminum sesquichloride.

5. The process of claim 1 in which said reaction is carried out at an elevated temperature up to 250° C.

References Cited in the file of this patent

UNITED STATES PATENTS

| | | |
|---|---|---|
| 2,762,824 | Brown | Sept. 11, 1956 |
| 2,853,504 | Jenkner | Sept. 23, 1958 |
| 2,914,549 | Anderson | Nov. 24, 1959 |

OTHER REFERENCES

Jenkner et al.: German application S.N. 18,392, printed Apr. 19, 1956 (Kl. 120 2603).